US009513612B2

(12) United States Patent
Park

(10) Patent No.: US 9,513,612 B2
(45) Date of Patent: Dec. 6, 2016

(54) INTEGRATED REMOTE CONTROL SYSTEM AND CONTROL METHOD THEREOF

(75) Inventor: Il-Woo Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 860 days.

(21) Appl. No.: 13/411,464

(22) Filed: Mar. 2, 2012

(65) Prior Publication Data

US 2012/0223820 A1 Sep. 6, 2012

(30) Foreign Application Priority Data

Mar. 2, 2011 (KR) .................. 10-2011-0018332

(51) Int. Cl.
G08C 19/16 (2006.01)
G05B 15/02 (2006.01)

(52) U.S. Cl.
CPC .................... G05B 15/02 (2013.01)

(58) Field of Classification Search
USPC ..................................... 340/12.52
See application file for complete search history.

(56) References Cited

U.S. PATENT DOCUMENTS

| 6,615,243 | B1 * | 9/2003 | Megeid | H04L 12/2803 |
| | | | | 375/E7.019 |
| 8,253,618 | B2 * | 8/2012 | Sunaga | G08C 17/00 |
| | | | | 340/12.22 |
| 2003/0121057 | A1 * | 6/2003 | Singh | H04N 21/4334 |
| | | | | 725/132 |
| 2003/0189509 | A1 * | 10/2003 | Hayes | G08C 17/02 |
| | | | | 341/176 |
| 2004/0266419 | A1 * | 12/2004 | Arling | G08C 17/00 |
| | | | | 455/420 |
| 2005/0110651 | A1 * | 5/2005 | Martis | G06F 3/00 |
| | | | | 340/12.29 |
| 2006/0066716 | A1 * | 3/2006 | Chang | H03J 1/0025 |
| | | | | 348/14.05 |
| 2006/0125652 | A1 * | 6/2006 | Zigmond | G08C 17/02 |
| | | | | 340/12.52 |
| 2006/0238369 | A1 * | 10/2006 | Mamontov | G08C 19/28 |
| | | | | 340/4.32 |
| 2006/0267741 | A1 * | 11/2006 | Park | G08C 17/02 |
| | | | | 340/12.3 |
| 2007/0014199 | A1 * | 1/2007 | Park | H05B 37/0272 |
| | | | | 369/30.06 |
| 2007/0139214 | A1 * | 6/2007 | Andersen | G08C 17/02 |
| | | | | 340/12.29 |
| 2007/0236327 | A1 * | 10/2007 | Miyashita | G05B 15/02 |
| | | | | 340/3.71 |
| 2008/0231762 | A1 * | 9/2008 | Hardacker | H04N 5/4403 |
| | | | | 348/734 |
| 2009/0057429 | A1 * | 3/2009 | Kim | F24F 11/0009 |
| | | | | 236/51 |
| 2010/0156658 | A1 | 6/2010 | Park et al. | |
| 2012/0007763 | A1 * | 1/2012 | Hale | G06F 3/023 |
| | | | | 341/176 |

FOREIGN PATENT DOCUMENTS

| KR | 10-2010-0076551 | 7/2010 |
| KR | 10-2010-0086570 | 8/2010 |

* cited by examiner

Primary Examiner — Naomi Small

(57) ABSTRACT

An integrated remote control system controls a plurality of peripheral electronic devices by a certain integrated operation to provide use convenience of the electronic devices. The integrated remote control system includes an integrated control device configured to store control codes of the peripheral electronic devices and provide the at least one control code of the peripheral electronic devices according to a request. The integrated remote control system also includes a user remote control device configured to request the integrated control device to transmit the control code for controlling the peripheral electronic device, receive the requested control code, and control the at least one of the peripheral electronic devices.

14 Claims, 7 Drawing Sheets

INTEGRATED REMOTE CONTROL SYSTEM AND CONTROL METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 2, 2011 and assigned Serial No. 10-2011-0018332, the entire disclosure of which is hereby incorporated by reference.

TECHNICAL FIELD OF THE INVENTION

The present disclosure relates to an integrated remote control system and a control method thereof. More particularly, the present disclosure relates to an integrated remote control system for controlling a plurality of peripheral electronic devices by a certain integrated operation to provide use convenience of the peripheral electronic devices and a control method thereof.

BACKGROUND OF THE INVENTION

In general, a variety of electronic devices are installed in a space such as home and work and are used as assisting devices for leading a convenient life. For example, there are electronic devices, such as a Video Cassette Recorder (VCR), a Digital Video Disc (DVD) player, a Blu-ray™ disc player, a DivX player, a set-top box, a Personal Computer (PC), and a home theater, that may be installed and used in home. The number of electronic devices is on a trend of being gradually increased. Each of the aforementioned electronic devices has a plurality of operating buttons in the device itself and simultaneously has a remote control device for remotely controlling it. Because this remote control device is connected at least one by one per electronic device, a user may need an equivalent number of remote control devices to control the plurality of electronic devices. Because one or more of these remote control devices may be lost, there is a problem in that a corresponding electronic device connected with the lost remote control device is not controlled.

Therefore, recently, an integrated remote control device was developed. The integrated remote control device controls a plurality of peripheral electronic devices using one remote control device. The integrated remote control device receives a control code of a peripheral electronic device through one integrated control device and transmits a corresponding control signal to control the corresponding electronic device.

This integrated remote control device controls a plurality of electronic devices using one remote control device. However, for example, when a user watches a movie using related electronic devices, namely a home theater, a TV, and a Blu-ray™ disc player, there is a problem in that the integrated remote control device may need to control the three electronic devices separately.

SUMMARY OF THE INVENTION

To address the above-discussed deficiencies of the prior art, it is a primary object to provide at least the advantages described below. Accordingly, an aspect of the present disclosure is to provide an integrated remote control system capable of being conveniently operated and a control method thereof.

Another aspect of the present disclosure is to provide an integrated remote control system capable of sequentially operating a plurality of electronic devices by only one setup and a control method thereof.

Another aspect of the present disclosure is to provide an integrated remote control system for operating a plurality of predetermined electronic devices together by only one operation and conveniently controlling the electronic devices and a control method thereof.

In accordance with an aspect of the present disclosure, an integrated remote control system for remotely controlling a plurality of electronic devices is provided. The integrated remote control system includes an integrated control device configured to store control codes of the peripheral electronic devices and provide the at least one control code of the peripheral electronic devices according to a request. The integrated remote control system also includes a user remote control device configured to request the integrated control device to transmit the at least one control code for controlling the peripheral electronic device, receive the requested control code, and control the at least one of the peripheral electronic devices.

In accordance with another aspect of the present disclosure, an integrated control device for providing a control code to a user remote control device is provided. The integrated control device includes a remote control communication unit configured to transmit a control code of a corresponding electronic device, which is requested from the user remote control device. The integrated control device also includes a storage unit configured to store the control code of the corresponding electronic device and an integrated control code for controlling a plurality of peripheral electronic devices together. The integrated control device further includes a controller configured to search the control code requested from the user remote control device, which is stored in the storage unit, and provide the searched control code to the user remote control device.

In accordance with another aspect of the present disclosure, a user remote control device for receiving a control code from an integrated control device and controlling peripheral electronic devices is provided. The user remote control device includes an input unit configured to set an integrated function using the integrated control device and receiving an input request for operating a corresponding electronic device. The user remote control device also includes a communication unit configured to request the integrated control device to transmit a control code and, receive the requested control code. The user remote control device further includes a signal transmitting unit configured to transmit a control signal to the corresponding electronic device using the received control code. The user remote control device still further includes a controller configured to sense the input request of the input unit, request the integrated control device to transmit the control code of the corresponding electronic device, receive the requested control code, generate the control signal of the corresponding electronic device by the control code, and provide the generated control signal to the signal transmitting unit.

In accordance with another aspect of the present disclosure, a method of setting an integrated control code for simultaneously controlling peripheral electronic devices at an integrated control device is provided. The method includes checking whether an integrated function setup request exists. The method also includes displaying functions of the peripheral electronic devices, which include a corresponding function when the integrated function setup request exists. The method further includes checking whether an input of the functions of the peripheral electronic devices is completed. The method still further includes storing a corresponding integrated control code when the input of the functions of the peripheral electronic devices is completed.

In accordance with another aspect of the present disclosure, an integrated control method of an integrated control device for controlling peripheral electronic devices by a user remote control device is provided. The integrated control method includes checking whether control codes of the peripheral electronic devices are requested from the user remote control device. The method also includes searching a previously stored control code of a corresponding electronic device when the control code of the corresponding electronic device is requested. The method further includes transmitting the searched corresponding control code to the user remote control device.

In accordance with another aspect of the present disclosure, a control method of a user remote control device for controlling peripheral devices using a control code received from an integrated control device is provided. The control method includes checking whether an operation of at least one corresponding electronic device is requested. The method also includes requesting the integrated control device to transmit a control code corresponding to the corresponding electronic device when the operation of the corresponding electronic device is requested. The method further includes checking whether to receive the corresponding control code from the integrated control device. The method still further includes transmitting a control signal corresponding to the corresponding control code to the corresponding electronic device when the corresponding control code is received.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. In the following description, well-known functions or constructions are not described in detail since they would obscure the disclosure in unnecessary detail.

Figure 1:
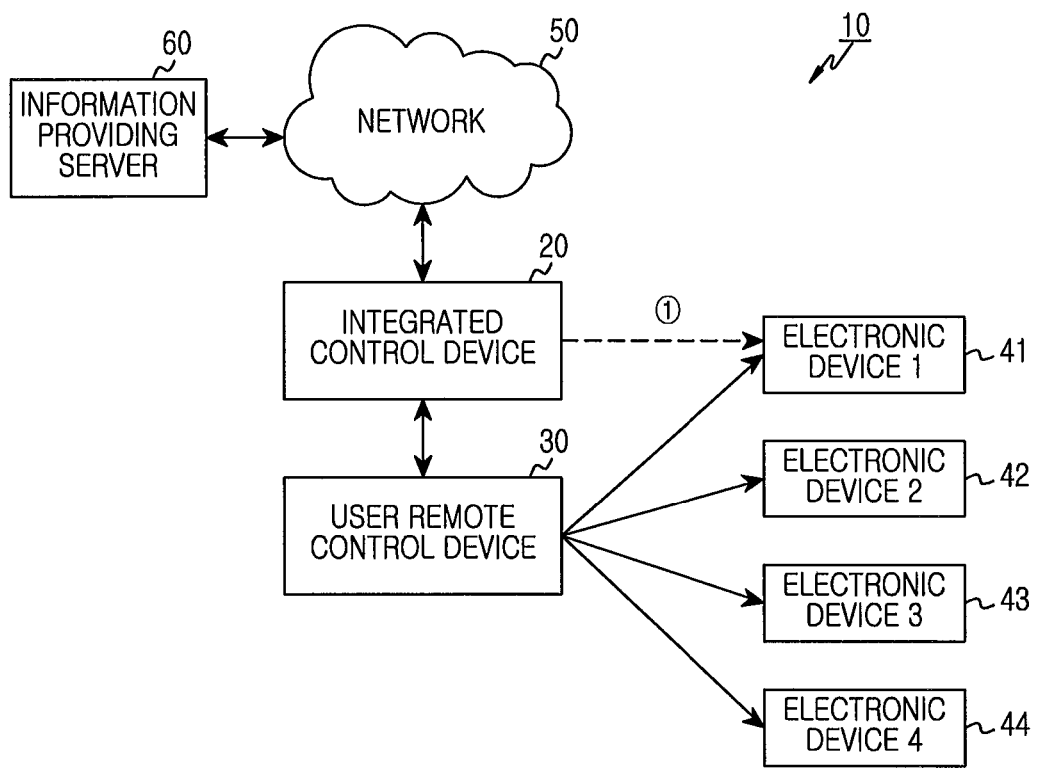
FIG. 1 illustrates a block diagram for a structure of an integrated remote control system according to one embodiment of the present disclosure.

FIG. 1 illustrates a block diagram for a structure of an integrated remote control system according to one embodiment of the present disclosure.

The integrated remote control system denoted by 10 according to the present disclosure includes an integrated control device 20 and a user remote control device 30 for receiving control codes for integrated functions, which are stored in the integrated control device 20, and controlling peripheral electronic devices 41 to 44. The integrated control device 20 interworks with a certain information providing server 60 through a network 50. The integrated control device 20 downloads control codes of corresponding electronic devices controlled by the user remote control device 30 and may update previously stored control codes as the downloaded control codes. The information providing server 60 may be a manufacturer's site of a corresponding electronic device on the Internet and may be one of a variety of information providing sites for an integrated remote control system.

In accordance with the present disclosure, the user remote control device 30 controls peripheral electronic devices directly to be differentiated from conventional techniques. In an embodiment, the user remote control device 30 requests the integrated control device 20 to transmit control codes of corresponding electronic devices, receives the control codes, and may control the electronic devices directly using the control codes. Further, the integrated remote control system 10 according to the present disclosure may input integrated function information for simultaneously executing functions of the plurality of electronic devices 41 to 44. This input information is stored in the integrated control device 20. Accordingly, a user pushes a specific key button (e.g., an integrated function button) of the user remote control device 30 only once and may easily control the plurality of electronic devices 41 to 44.

Figure 2:
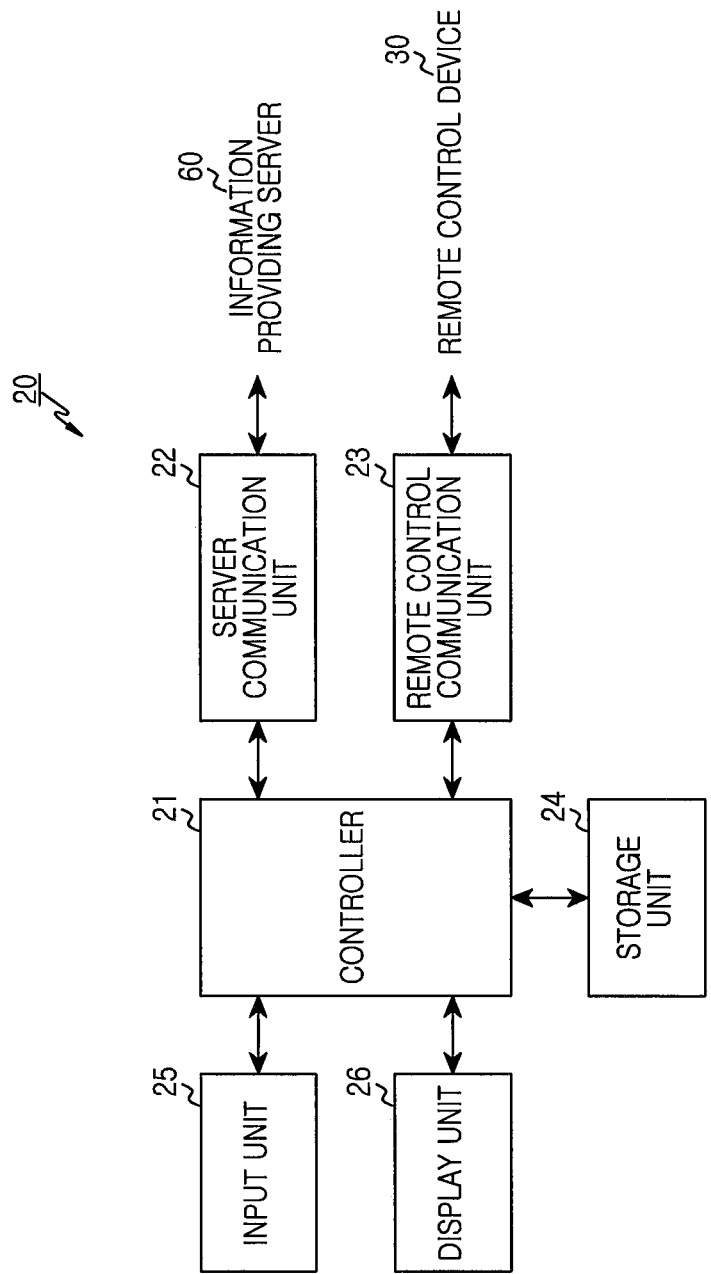
FIG. 2 illustrates a block diagram for a structure of an integrated control device according to one embodiment of the present disclosure.

FIG. 2 illustrates a block diagram for a structure of an integrated control device according to one embodiment of the present disclosure.

The integrated control device denoted by 20 according to the present disclosure may include a controller 21, a server communication unit 22, a remote control communication unit 23, an input unit 25, a display unit 26, and a storage unit 24.

The controller 21 controls certain processes of the integrated control device 20. The controller 21 requests the information providing server 60 to download control codes of corresponding electronic devices through the remote control communication unit 23, receives the control codes, and may store the received control codes in the storage unit 24. Also, the controller 21 receives control codes of corresponding electronic devices from the user remote control device 30, determines the received control codes, selects a corresponding control code according to previously stored corresponding integrated function information, and may transmit the selected corresponding control code to the user remote control device 30 through the remote control communication unit 23. Also, if an integrated input request is sensed by an operation of a user, the controller 21 generates an input request picture. If input of corresponding electronic devices is completed, the controller 21 may store the input in an integrated input list of the storage unit 24. Also, the controller 21 communicates with the information providing server 60 and may periodically update previously stored control codes of electronic devices.

The server communication unit 22 provides information of a corresponding electronic device (e.g., a product number of the electric device, a serial number, and the like) to the information providing server 60 according to a request of the controller 21. The server communication unit 22 may receive a control code corresponding to the information through the information providing server 60. The server communication unit 22 may be variously used through a well-known wireless communication network, a Wi-Fi network, and the like.

The remote control communication unit 23 communicates with the user remote control device 30. The remote control communication unit 23 receives a control code request of a corresponding electronic device from the user remote control device 30 or transmits a control code stored in the storage unit 24 to the user remote control device 30. Accordingly, the remote control communication unit 23 may be a well-known bi-directional communication means and may be used through a Wi-Fi network, a Radio Frequency for Consumer Electronics (RF4CE) network, and the like, which are used as a local area communication network.

The input unit 25 may be used for setup of an integrated function using the user remote control device 30. However, the present disclosure is not limited to the input unit 25. Although the input unit 25 does not exist in the integrated control device 20, it is possible to set an integrated function by the user remote control device 30.

The display unit 26 may display an integrated function setup state using the user remote control device 30 to a user or may display a list of peripheral electronic devices which are currently controlled. Also, the present disclosure is not limited to the display unit 26. The present disclosure may perform the aforementioned function using a display device such as a TV among peripheral devices. For example, as shown in FIG. 1, the integrated control device 20 and the electronic device 1 41 are connected by a wire network (①) of a type such as a High Definition Multimedia Interface (HDMI). Herein, the electronic device 1 41 may be a display device such as a TV.

The storage unit 24 may store a variety of information generated at the integrated control device 20. Also, the storage unit 24 may store a separate control code for a corresponding electronic device. In addition, the storage unit 24 may store a control code according to integrated information input by the user.

Preferably, the integrated control device 20 may be independently operated and may be mounted in equipment, capable of transmitting a picture to a display device, such as a TV, a set-top box, and a Blu-ray™ disc player.

Figure 3:
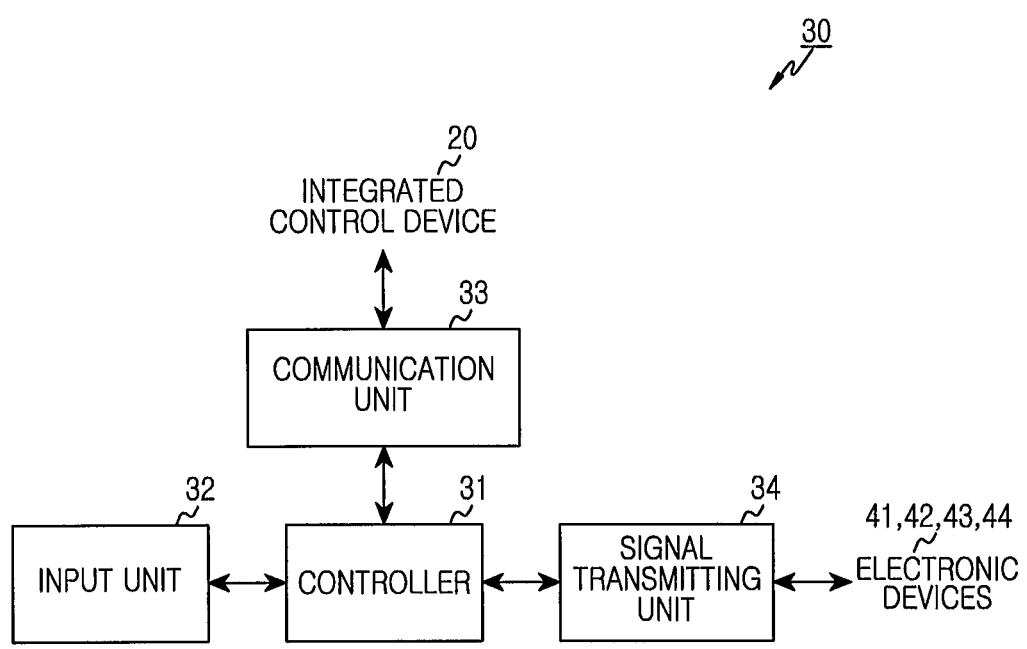
FIG. 3 illustrates a block diagram for a structure of a user remote control device according to one embodiment of the present disclosure.

FIG. 3 illustrates a block diagram for a structure of a user remote control device according to one embodiment of the present disclosure.

As shown in FIG. 3, the user remote control device denoted by 30 includes a controller 31, a communication unit 33, an input unit 32, and a signal transmitting unit 34.

The controller 31 requests the integrated control device 20 to transmit a control code of a corresponding electronic device according to a control request of peripheral electronic devices of a user, converts the corresponding control code received from the integrated control device 20 into a control signal, and transmits the control signal to corresponding electronic devices through the signal transmitting unit 34 to control the corresponding electronic devices directly. Also, the controller 31 receives an integrated control signal according to the present disclosure and may transmit control signals for controlling a plurality of electronic devices sequentially by only one input of a user.

The communication unit 33 is used for bi-directional communication with the integrated control device 20. The communication unit 33 may be used through the well-known communication network described above, for example a Wi-Fi network, an RF4CE network, and the like.

The input unit 32 may be used for setup of an integrated function using the integrated control device 20 as well as for an input request for controlling peripheral electronic devices from the user. The input unit 32 may include a variety of function input buttons of the user remote control device 30. Also, the input unit 32 may include a separate integrated function execution button.

The signal transmitting unit 34 receives the control signal of the controller 31 and transmits the control signal for controlling peripheral electronic devices. The signal transmitting unit 34 may be an infrared ray device capable of generating a plurality of wavelength signals by the controller 31. Also, the signal transmitting unit 34 may use the aforementioned local area communication network.

Figure 4:
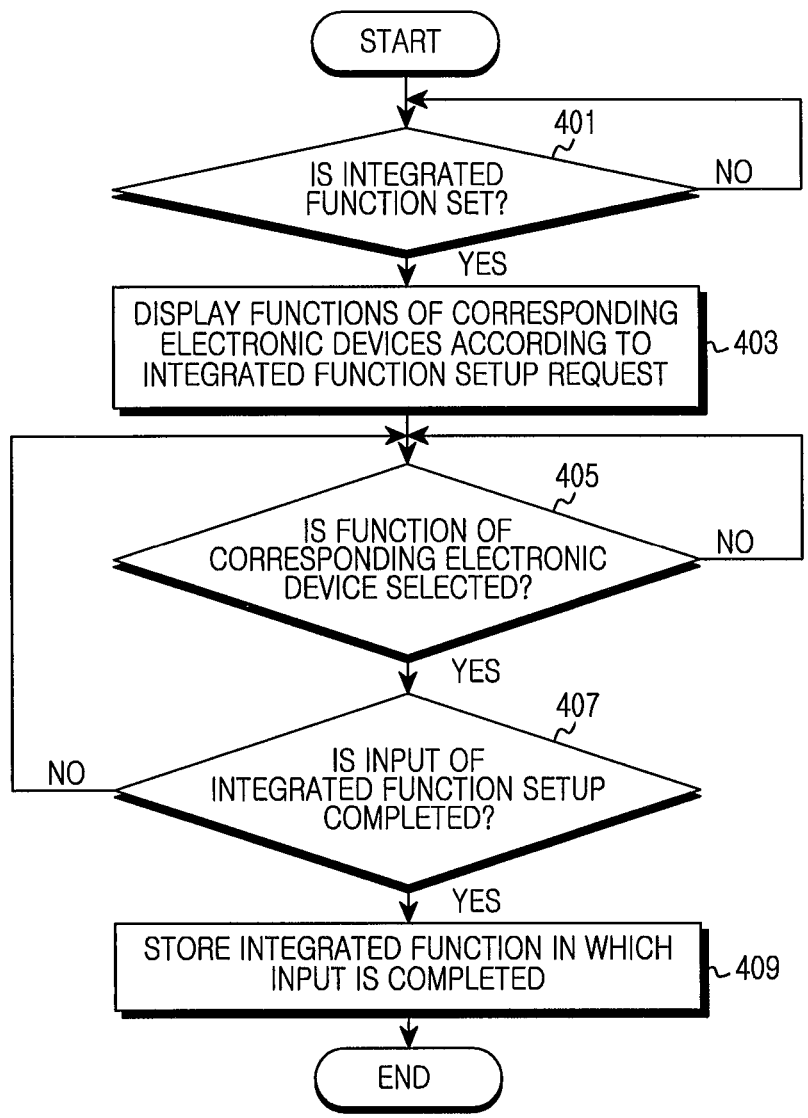
FIG. 4 illustrates a flowchart for a process of inputting an integrated function of an integrated control device according to one embodiment of the present disclosure.
Figure 5:
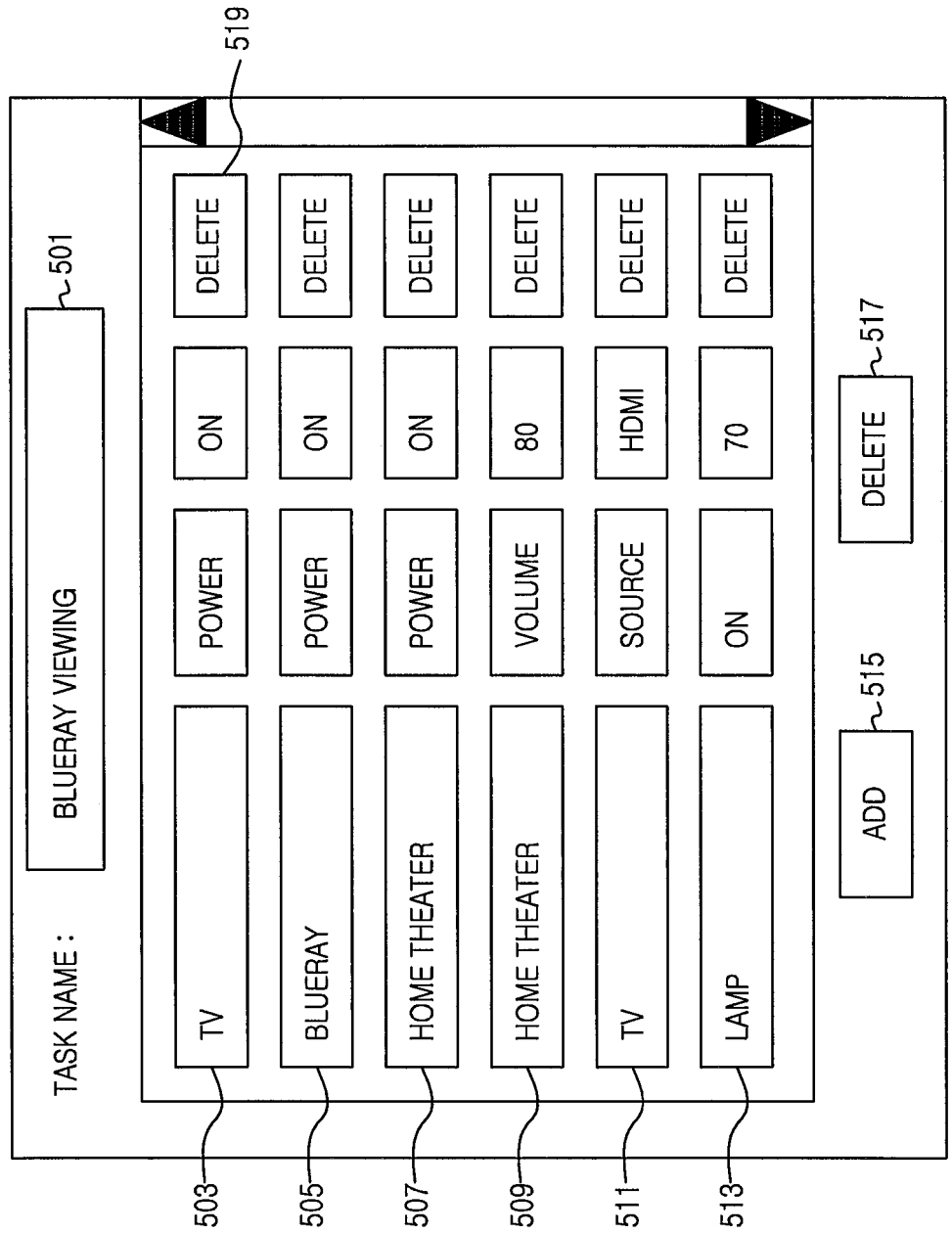
FIG. 5 illustrates an input picture for the process shown in FIG. 4 according to one embodiment of the present disclosure.

FIG. 4 illustrates a flowchart for a process of inputting an integrated function of an integrated control device according to one embodiment of the present disclosure. FIG. 5 is an input picture illustrating the process shown in FIG. 4 according to one embodiment of the present disclosure.

An integrated function setup process according to the present disclosure will be described later with reference to FIG. 4 and FIG. 5.

First, a controller checks whether an integrated function setup request exists in block 401. The process of checking this integrated function setup request may include both a process of sensing input of an input unit installed in the integrated control device itself and a process of checking whether an integrated function setup request message of a user remote control device is received.

The controller displays functions of corresponding electronic devices according to the integrated function setup request in block 403. That is, the controller may display an input picture for setting an integrated function, as shown in FIG. 5, on a display unit. The integrated function setup picture may be displayed on the display unit included in the integrated control device itself. However, the present disclosure is not limited to the display unit. For example, the present disclosure may use a display device included in a peripheral electronic device.

As shown in FIG. 5, if a user enters the input picture for setting the integrated function, an integrated function item 501 is displayed on the top end. Accordingly, a plurality of usable peripheral electronic devices may be displayed. For example, as shown in FIG. 5, if Blu-ray™ viewing is selected at the integrated function item 501, corresponding electronic devices according to the selected Blu-ray™ viewing are listed. Each of the listed electronic devices has a power on/off item. There is a delete button of a corresponding electronic device.

The controller checks whether functions of corresponding electronic devices are selected in block 405. Corresponding functions may be variously selected. For example, if the Blu-ray™ viewing is selected, a TV item 503 is set to "ON" and a connection type of a TV item 511 is set to "HDMI". A Blu-ray™ device item 505 is also set to "ON". A home theater item 507 is also set to "ON" and a volume level of a home theater item 509 is set to a certain value, e.g., "80". Also, a lamp item 513 is set to "ON" and brightness of the lamp item is set, e.g., to "70".

The controller checks whether input of the integrated function setup is completed in block 407. That is, if input of an add button 515 of a bottom end shown in FIG. 5 is sensed, the controller proceeds to block 409 and may store information about the completed integrated function in a storage unit. On the other end, the controller may delete previously stored information about an integrated input function using a delete button 517.

Figure 6:
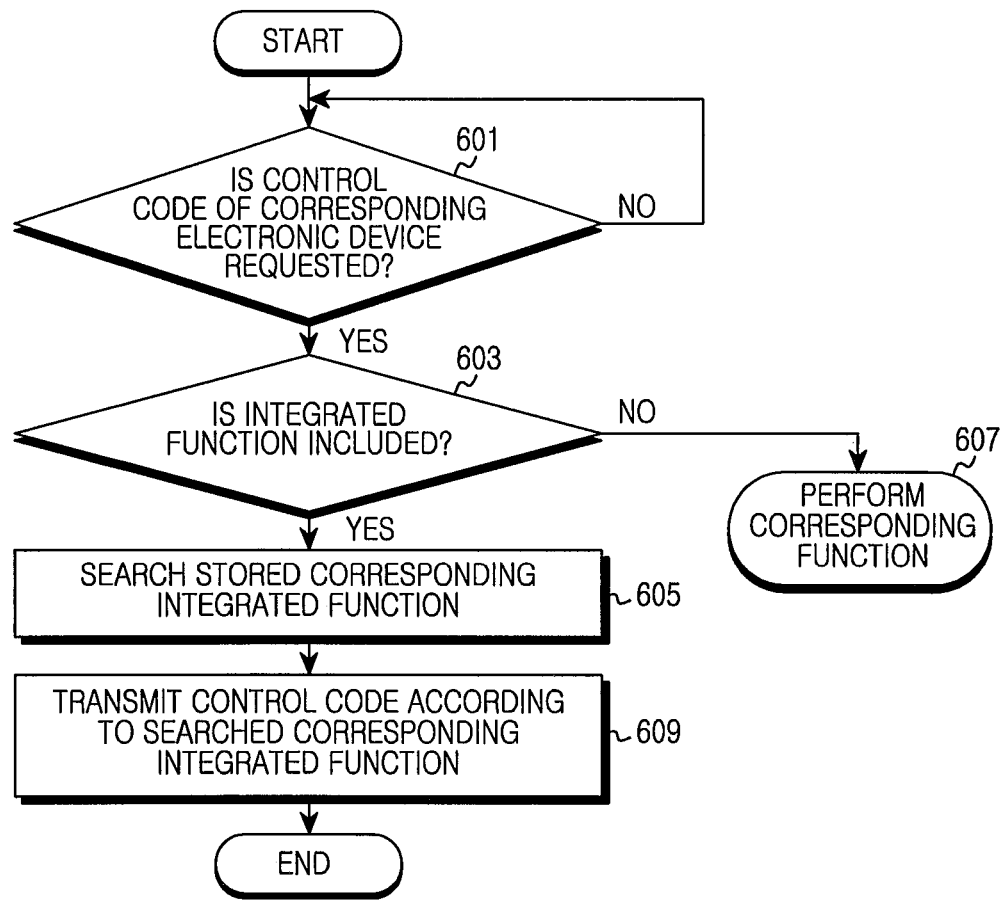
FIG. 6 illustrates a process of transmitting a control code of an integrated control device according to one embodiment of the present disclosure.

FIG. 6 illustrates a flowchart for a process of transmitting a control code of an integrated control device according to one embodiment of the present disclosure.

The controller checks whether a request of a control code of a corresponding electronic device exists from a user remote control device in block 601. The controller checks whether the received control code request includes an integrated function in block 603. If the received control code request is not the integrated function but only a control code request of one peripheral electronic device, the controller may perform a corresponding function for transmitting a separate control code of a corresponding electronic device which is previously stored in a storage unit in block 607.

If the received control code request includes the integrated function in block 603, the controller proceeds to block 605 and searches a corresponding integrated function stored in the storage unit. The controller proceeds to block 609 and transmits a control code corresponding to the searched corresponding integrated function to the user remote control device.

Figure 7:
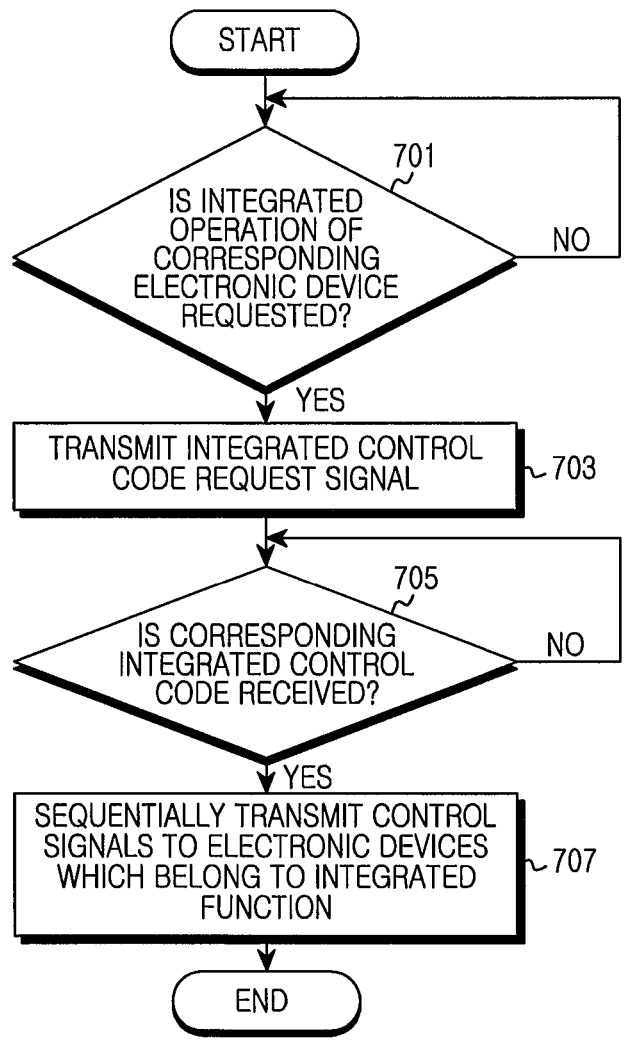
FIG. 7 illustrates a process of a user remote control device according to one embodiment of the present disclosure.

FIG. 7 illustrates a flowchart for a process of a user remote control device for controlling electronic devices according to one embodiment of the present disclosure.

A controller checks whether an integrated operation request of a corresponding electronic device exists from a user in block 701. That is, the controller checks whether a button for performing an integrated function of the user remote control device is pushed by the user. If the integrated operation request exists, the controller proceeds to block 703 and transmits an integrated control code request signal to an integrated control device.

The controller checks whether a corresponding integrated control code is received in block 705. If the corresponding integrated control code is received, the controller proceeds to block 707 and sequentially transmits control signals to electronic devices which belong to an integrated function to operate the electronic devices. For example, if integrated setup of the integrated control device is performed as shown in FIG. 5 and if integrated control for Blu-ray™ viewing is performed, the user remote control device may perform the following certain processes by only one operation of the user.

1) The controller transmits a power key control code of a TV to operate the TV.

2) The controller transmits a power key control code of a Blu-ray™ disc player to operate the Blu-ray™ disc player.

3) The controller transmits a power control code of a home theater to operate the home theater.

4) The controller sets a volume level of the home theater to '80' (or another suitable value).

5) The controller sets picture input of the TV through an HDMI input (or another suitable input)

6) The controller sets a brightness of a lamp to '70' (or another suitable value).

Although it is not shown in FIG. 1 to FIG. 7, when separate control of a peripheral electronic device except for the integrated function is performed, the user also operates the user remote control device. The user remote control device receives a control code from the integrated control device, converts the received control code into a control signal, and transmits the control signal to a corresponding electronic device to control the corresponding electronic device.

In conclusion, the integrated remote control system according to the present disclosure increases use convenience of peripheral electronic devices by sequentially operating the predetermined peripheral electronic devices by only one operation.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A system, comprising:
an integrated control device configured to:
store a control code used to simultaneously control a plurality of peripheral electronic devices, and
wirelessly transmit the control code to a user remote control device in response to receiving a request for the control code from the user remote control device, wherein the control code comprises control signals for controlling each of the plurality of peripheral electronic devices,
wherein, for storing the control code, the integrated control device is configured to:
receive, from the user remote control device, a first signal for initiating an integrated function setup;
display a user interface screen for the integrated function setup via a display in response to the reception of the first signal, wherein the display is included in the integrated control device or one of the peripheral electronic devices connected with the integrated control device;

receive, from the user remote control device, a second signal in association with the user interface screen for the integrated function setup;

make out a control list according the second signal and display the control list via the user interface screen, wherein the control list itemizes functional controls of individual peripheral electronic devices;

receive, from the user remote control device, a third signal for completing making up the control list; and generate the control code based on the control list in response to the reception of the third signal, and store the control code in a storage of the integrated control device, wherein the user remote control device, including a plurality of key buttons for a user input, is configured to remotely and simultaneously control the plurality of peripheral electronic devices based on the user input by the user remote control device being configured to:

detect a first user input for initiating the integrated function setup, and transmit the first signal according to the first user input to the integrated control device;

detect a second user input for making out the control list, and transmit the second signal according to the second user input to the integrated control device;

detect a third user input for completing making up the control list, and transmit the third signal according to the third user input to the integrated control device;

wirelessly transmit, to the integrated control device, the request for the control code used to simultaneously control the plurality of peripheral electronic devices in response to a user selection of a predefined key button among the plurality of key buttons;

wirelessly receive the requested control code from the integrated control device;

convert the received control code into the control signals for controlling each of the plurality of peripheral electronic devices; and wirelessly transmit each of the converted control signals to each of the plurality of peripheral electronic devices.

2. The system of claim 1, wherein the integrated control device is further configured to:

communicate with an information providing server; and
receive and store another control codes of the peripheral electronic devices from the information providing server.

3. The system of claim 1, wherein the integrated control device does not control the peripheral electronic devices directly.

4. The system of claim 1, wherein the user remote control device is configured to directly control the plurality of peripheral electronic devices using the control code received from the integrated control device.

5. An integrated control device, comprising:

a communication unit configured to wirelessly communicate with a user remote control device; and a controller configured to:

receive, from a user remote control device, a first signal for initiating an integrated function setup;

display a user interface screen for the integrated function setup via a display in response to the reception of the first signal, wherein the display is included in the integrated control device or one of a plurality of peripheral electronic devices connected with the integrated control device;

receive, from the user remote control device, a second signal in association with the user interface screen for the integrated function setup;

make out a control list according the second signal and display the control list via the user interface screen, wherein the control list itemizes functional controls of individual peripheral electronic devices;

receive, from the user remote control device, a third signal for completing making up the control list;

generate a control code based on the control list in response to the reception of the third signal, and store the control code in a storage of the integrated control device; and wirelessly transmit the control code to the user remote control device in response to receiving a request for the control code from the user remote control device, wherein the control code comprises control signals for simultaneously controlling each of the plurality of peripheral electronic devices.

6. The integrated control device of claim 5, wherein the integrated control device is composed as a separate device, or is embedded in one of the peripheral electronic devices.

7. The integrated control device of claim 5, further comprising a server communication unit configured to communicate with an information providing server to receive another control codes of peripheral electronic devices.

8. A user remote control device comprising:

an input unit including a plurality of key buttons for a user input;

a communication unit configured to wirelessly communicate with an integrated control device and a plurality of peripheral electronic devices; and a controller configured to:

detect a first user input for initiating an integrated function setup, and transmit a first signal according to the first user input to the integrated control device so that the integrated control device displays a user interface screen for the integrated function setup via a display in response to the first signal;

detect a second user input for making out a control list, and transmit a second signal according to the second user input to the integrated control device so that the integrated control device makes out the control list according to the second signal and displays the control list via the user interface screen, and wherein the control list itemizes functional controls of individual peripheral electronic devices;

detect a third user input for completing making up the control list, and transmit a third signal according to the third user input to the integrated control device so that the integrated control devices generates a control code based on the control list in response to the third signal, and stores the control code in a storage of the integrated control device;

wirelessly transmit, to the integrated control device, a request for the control code used to simultaneously control the plurality of peripheral electronic devices in response to detecting a user selection of a predefined key button among the plurality of key buttons;

wirelessly receive the requested control code from the integrated control device;

convert the received control code into the control signals for controlling each of the plurality of peripheral electronic devices; and wirelessly transmit, to each of the plurality of peripheral electronic devices, each of the converted control signals for remotely and simultaneously controlling the plurality of peripheral electronic devices.

9. The user remote control device of claim 8, wherein the communication unit is one of a Wi-Fi communication unit and a Radio Frequency for Consumer Electronics (RF4CE) communication unit, which perform bidirectional communication.

10. The user remote control device of claim 8, wherein a signal transmitting unit is configured to use infrared ray communication.

11. The user remote control device of claim 8, further comprising a separate input unit configured to perform integrated control for simultaneously controlling the peripheral electronic devices.

12. The user remote control device of claim 11, wherein, when the requested control code for the integrated control is received, the controller is configured to automatically and sequentially transmit the control signals according to the corresponding control codes to the corresponding peripheral electronic devices.

13. A method of an integrated control device, the method comprising:
   storing a control code used to simultaneously control a plurality of different peripheral electronic devices, and
   wirelessly transmitting the control code to a user remote control device in response to receiving a request for the control code from the user remote control device, wherein the control code comprises control signals for controlling each of the plurality of peripheral electronic devices,
   wherein storing the control code used to simultaneously control the plurality of different peripheral electronic devices comprises:
      receiving, from a user remote control device, a first signal for initiating an integrated function setup;
      displaying a user interface screen for the integrated function setup via a display in response to the reception of the first signal, wherein the display is included in the integrated control device or one of the peripheral electronic devices connected with the integrated control device;
      receiving, from the user remote control device, a second signal in association with the user interface screen for the integrated function setup;
      making out a control list according the second signal and displaying the control list via the user interface screen, wherein the control list itemizes functional controls of individual peripheral electronic devices;
      receiving, from the user remote control device, a third signal for completing making up the control list; and
      generating the control code based on the control list in response to the reception of the third signal, and storing the control code in a storage of the integrated control device.

14. A method of a user remote control device, the method comprising:
   detecting a first user input for initiating an integrated function setup, and transmitting a first signal according to the first user input to an integrated control device so that the integrated control device displays a user interface screen for the integrated function setup via a display in response to the first signal;
   detecting a second user input for making out a control list in associated with the user interface screen, and transmitting a second signal according to the second user input to the integrated control device so that the integrated control device makes out the control list according to the second signal and displays the control list via the user interface screen, and wherein the control list itemizes functional controls of individual peripheral electronic devices;
   detecting a third user input for completing making up the control list, and transmitting a third signal according to the third user input to the integrated control device so that the integrated control device generates a control code based on the control list in response to the third signal, and stores the control code in a storage of the integrated control device;
   wirelessly transmitting, to the integrated control device, a request for the control code used to simultaneously control a plurality of different peripheral electronic devices;
   wirelessly receiving the requested control code from the integrated control device;
   converting the received control code into the control signals for controlling each of the plurality different peripheral electronic devices; and
   wirelessly transmitting each of the converted control signals to each of the plurality of peripheral electronic devices.

* * * * *